Jan. 24, 1950
C. E. WOOD
2,495,359
SCAFFOLD CLAMP
Filed March 20, 1947
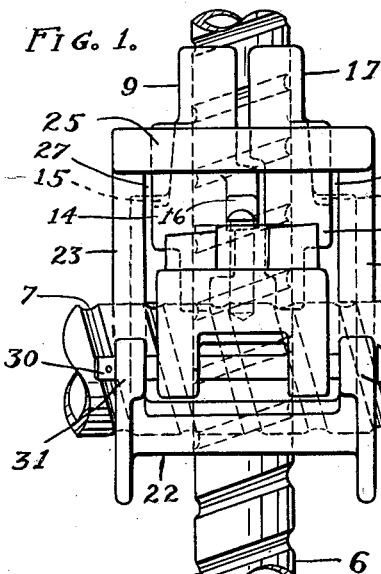
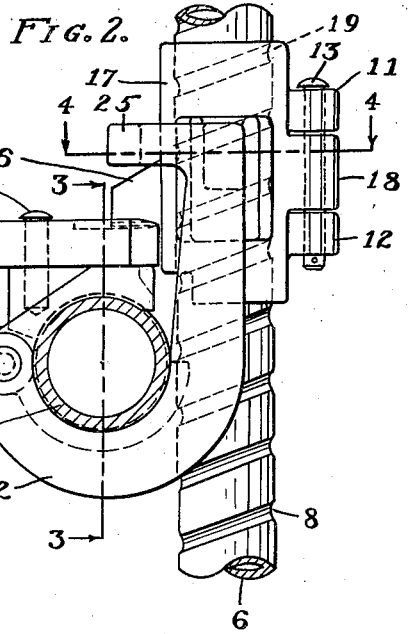
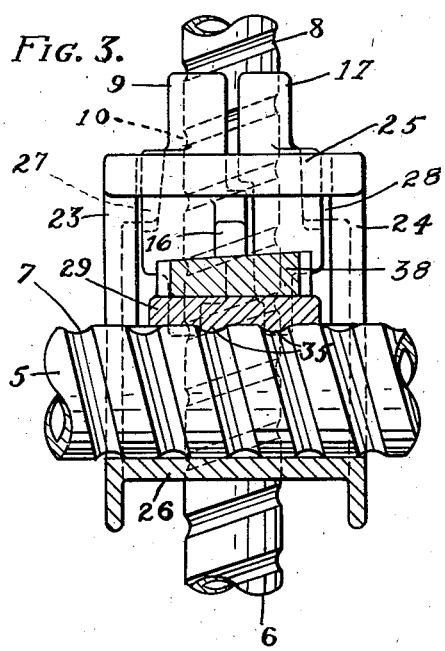
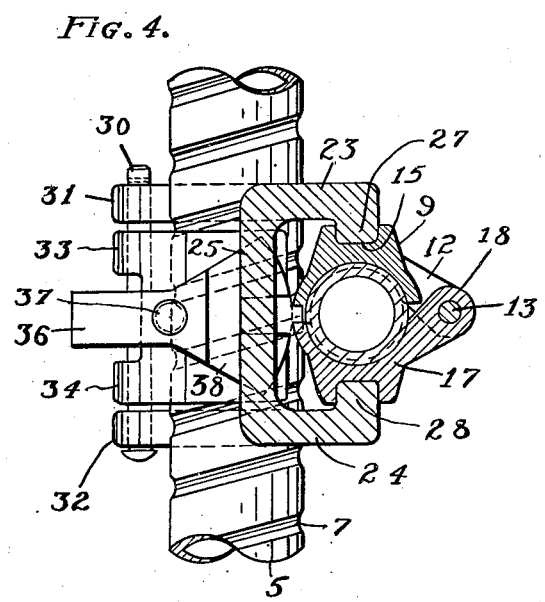
Inventor
CARL E. WOOD
By Fruh Wells
Attorney Patented Jan. 24, 1950

2,495,359

UNITED STATES PATENT OFFICE 2,495,359

SCAFFOLD CLAMP

Carl E. Wood, Milwaukee, Wis., assignor to Kendall Corporation, Milwaukee, Wis., a corporation of Wisconsin Application March 20, 1947, Serial No. 736,025

6 Claims. (Cl. 304—40)

My invention relates to scaffolding and refers particularly to scaffolding of the type shown in the patent to Pollman, No. 2,294,240, dated August 25, 1942.

It is the principal purpose of my invention to provide an improved clamp construction for supporting cross members on the uprights of scaffolding. In mounting cross members, such as platform supports, braces etc., it is desirable to have clamping means that may be applied and removed quickly without need for special tools. The clamping means must, however, be securely locked when in position, to prevent shifting of the cross member in the clamp and to prevent shifting of the clamp on the upright. According to my invention the clamping means consists of two units, one unit engaging the upright and the other unit carrying the cross member, the two units being provided with interengaging means utilizing both units to accomplish the clamping.

The nature and advantages of my invention will appear more fully from the following description and the accompanying drawings illustrating a preferred form of the invention. It should be understood, however, that the drawings and description are illustrative only, and are not to be taken as limiting the invention, except in so far as it is limited by the claims.

In the drawings:

Figure 1 is a view in side elevation of a clamp embodying my invention applied to an upright to support a cross member such as a platform support;

Figure 2 is a view in side elevation of the clamp, taken at right angles to Figure 1;

Figure 3 is a sectional view taken on the line 3—3 of Figure 2; and

Figure 4 is a sectional view taken on the line 4—4 of Figure 2.

Referring now to the drawings, my invention is shown in connection with the mounting of a platform support or "put-log" 5 upon an upright 6. As shown the upright 6 and the support 5 are made, as disclosed in the Pollman patent, of spirally corrugated tubing. The grooves 7 and 8 in the support 5 and the upright 6 are utilized in applying my improved clamp; although the novel features of the clamp are not limited to spirally corrugated tubing as will be evident from the following description of the clamp.

The clamp includes a body member 9 having a concave inner surface for engaging the upright 6. The body member 9 is provided with beads 10 on its concave surface for engaging the grooves in the upright. The body 9 has two ears 11 and 12 (Fig. 2) apertured to receive a pivot pin 13. The body also has a lug 14 on the exterior thereof which is provided with a tapered channel 15 extending downwardly from the top edge of the lug. The body 9 also has a lug 16 at its front edge, opposite the ears 11 and 12. The lower face of the lug is formed at a slight angle to a plane perpendicular to the axis of the body.

A body clamp 17 is formed with a concave inner face complementary to the inner face of the body 9 for receiving the spirally corrugated tubing. The clamp 17 has an ear 18 which is apertured to receive the pin 13. The body clamp 17 also has beads 19 on its concave surface to seat in the grooves 8 of the upright 6. The body clamp also has a lug 20 thereon provided with a tapered channel 21.

A cradle 22 has two side bars 23 and 24 offset at their upper ends and connected by a cross bar 25. The lower portion of the cradle is a concave web 26 receiving the "put-log" 5. The upper ends of the bars 23 and 24 have tapered inwardly facing lugs 27 and 28 adapted to seat in the channels 15 and 21 on body 9 and the body clamp 17. Downward pull on the cradle 22 acts to cause the body 9 and the body clamp 17 to close on the upright 6 and grip it tightly. An increase in load on the cradle increases the clamping force on the upright 6 by the body and the body clamp.

A cradle clamp 29 is pivoted to the cradle 22 by means of a pivot pin 30 which extends through two ears 31 and 32 on the cradle 22 and two ears 33 and 34 on the cradle clamp 29. The cradle clamp 29 has a concave lower surface which has beads 35 thereon engaging the grooves 7 in the member 5.

The cradle clamp has a swing wedge 36 pivoted on the top thereof by a pin 37. The wedge 36 has a quadrant shaped portion 38 that is tapered crosswise to engage the lower surface of the lug 16.

The body 9, the body clamp 17 and their pivot pin 13 make up one unit of the clamping device which is adapted to receive the upright 6. The other unit comprises the cradle 22, the cradle clamp 29 and the swing wedge 36. When the first unit is applied to an upright 6 and the cradle unit is mounted by dropping the lugs 27 and 28 into the channels 15 and 21, the clamping device is secured on the upright. The cross member 5 may be mounted in the cradle before or after the cradle is applied to the first clamping unit. When the parts are in place, the swing wedge 36 is forced beneath the lug 16 to securely lock the parts together. It will be noted that the swing wedge serves to force the cradle clamp against the cross member 5 and simultaneously to force the lugs 27 and 28 down in the channels 15 and 21.

It is believed that the nature and advantages of my invention will be apparent from the foregoing description.

Having described my invention, I claim:

1. A scaffolding clamp comprising an upright clamping unit composed of a body and a body clamp pivoted together, a cross member cradle, lugs on the cradle, channels in the body and body clamp receiving the lugs, a cradle clamp pivoted to the cradle, and cooperating members on the cradle clamp and body locking the parts together.

2. A scaffolding clamp comprising an upright clamping unit composed of a body and a body clamp pivoted together, a cross member cradle, lugs on the cradle, channels in the body and body clamp receiving the lugs, a cradle clamp pivoted to the cradle, a lug on the body, and a wedge on the cradle clamp engaging the lug.

3. A clamp of the character described comprising a main body made up of a body member having a longitudinal groove adapted to receive a tube or rod, a complementary body clamp having a similar groove and hinged to the body member whereby they may be closed upon a tube or rod, said member and clamp having outwardly diverging guide surfaces on their opposite outer faces running in the same direction as the grooves, a cradle member having a seat therein for a tube or rod to be laid and having a clamp member hinged thereon and adapted to clamp a rod or tube in said seat, side bars projecting from said cradle and having lugs engaging said diverging guide surfaces and pressing the body member and body clamp together, and cooperating latch members on the clamp member and the main body securing them together.

4. A clamp of the character described comprising a main body made up of a body member having a longitudinal groove adapted to receive a tube or rod, a complementary body clamp having a similar groove and hinged to the body member whereby they may be closed upon a tube or rod, said member having outwardly diverging guide surfaces on their opposite outer faces running in the same direction as the grooves, a cradle member having a seat therein for a tube or rod to be laid and having a clamp member hinged thereon and adapted to clamp a rod or tube in said seat, side bars projecting from said cradle and having lugs engaging said diverging guide surfaces and pressing the body member and body clamp together, a lug on the main body and a wedge member on the cradle clamp member, the lug having a sloped surface facing away from the guide surfaces, and the wedge member being movable across said sloping face.

5. A clamp of the character described comprising one unit composed of two complementary grooved parts hinged together to receive a tube or rod therebetween, said parts having lug receiving channels closed at on end on their outer faces, a second unit having side bars provided with lugs positioned to slide into said channels and to thereby clamp the parts of the first unit together, said second unit including a cradle portion for receiving a cross tube or rod and a clamp pivoted on said cradle portion to cover a tube laid therein, a lug on the first unit facing the cradle, and a wedge on the clamp fitting against the lug to clamp the parts together.

6. A clamp of the character described comprising one unit composed of two complementary grooved parts hinged together to receive a tube or rod therebetween, said parts having lug receiving channels closed at one end on their outer faces, a second unit having side bars provided with lugs positioned to slide into said channels and to thereby clamp the parts of the first unit together, said second unit including a cradle portion for receiving a cross tube or rod, and a clamp pivoted on said cradle portion to cover a tube laid therein, and cooperating members on the units for holding the lugs on said bars in said channels.

CARL E. WOOD.

REFERENCES CITED

The following references are of record in the file of this patent:

UNITED STATES PATENTS

| Number | Name | Date |
|---|---|---|
| 2,165,221 | Burton | July 11, 1939 |